(12) United States Patent
Lee et al.

(10) Patent No.: US 8,467,469 B2
(45) Date of Patent: Jun. 18, 2013

(54) METHOD AND USER EQUIPMENT FOR TRANSMITTING PRECODING MATRIX INFORMATION, AND METHOD AND BASE STATION FOR CONFIGURING PRECODING MATRIX

(75) Inventors: Moon Il Lee, Anyang-si (KR); Jae Hoon Chung, Anyang-si (KR); Hyun Soo Ko, Seoul (KR); Seung Hee Han, Seoul (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/042,366

(22) Filed: Mar. 7, 2011

(65) Prior Publication Data

US 2011/0216846 A1    Sep. 8, 2011

Related U.S. Application Data

(60) Provisional application No. 61/357,534, filed on Jun. 23, 2010, provisional application No. 61/314,591, filed on Mar. 17, 2010, provisional application No. 61/311,393, filed on Mar. 8, 2010.

(30) Foreign Application Priority Data

Feb. 25, 2011    (KR) ........................ 10-2011-0017025

(51) Int. Cl.
*H04B 7/02*    (2006.01)
(52) U.S. Cl.
USPC ........... 375/267; 375/260; 375/295; 375/299; 375/316; 375/340; 375/347; 455/101; 455/132; 455/296; 455/500; 455/562.1; 370/334

(58) Field of Classification Search
USPC ................. 375/260, 267, 295, 299, 316, 340, 375/347; 455/101, 132, 296, 500, 562.1; 370/334
See application file for complete search history.

(56) References Cited

U.S. PATENT DOCUMENTS

2007/0165738 A1    7/2007    Barriac et al.
2009/0046569 A1*   2/2009    Chen et al. .................... 370/203

FOREIGN PATENT DOCUMENTS

EP    2157707         2/2010
KR    10-2008-0052900  6/2008
KR    1020100013263    2/2010

* cited by examiner

*Primary Examiner* — Leon Flores
(74) *Attorney, Agent, or Firm* — Lee, Hong, Degerman, Kang & Waimey

(57) ABSTRACT

An apparatus and method for a precoding matrix are disclosed. A codebook used for selecting a precoding matrix is comprised of m subgroups each including n precoding matrices. A user equipment indicates a specific precoding matrix selected from the codebook by transmitting to a base station a first codebook index indicating one of the m subgroups and a second codebook index indicating one of n precoding matrices in a subgroup. The base station configures the specific precoding matrix from the codebook based on the first and second codebook indexes.

20 Claims, 8 Drawing Sheets

(a) ULA setup                (b) X - pol setup

METHOD AND USER EQUIPMENT FOR TRANSMITTING PRECODING MATRIX INFORMATION, AND METHOD AND BASE STATION FOR CONFIGURING PRECODING MATRIX

CROSS-REFERENCE TO RELATED APPLICATIONS

Pursuant to 35 U.S.C. §119, this application claims the benefit of earlier filing date and right of priority to Korean Application No. 10-2011-0017025 filed on Feb. 25, 2011, and also claims the benefit of U.S. Provisional Application Ser. Nos. 61/357,534, filed on Jun. 23, 2010, 61/314,591, filed on Mar. 17, 2010, and 61/311,393, filed on Mar. 8, 2010, the contents of all of which are incorporated by reference herein in their entirety.

BACKGROUND OF THE INVENTION

1. Field of the Invention

The present invention relates to a wireless communication system, and more particularly, to a method and apparatus for indicating a precoding matrix for use in downlink data.

2. Discussion of the Related Art

In a multiple antenna system or a Multiple-Input Multiple-Output (MIMO) system, precoding may provide high peak-to-average system throughput by providing a beamforming gain and a diversity gain to a transmitting side and a receiving side. However, a precoding scheme should be appropriately designed in consideration of antenna setup, channel environments, system structure, etc.

Generally, a MIMO system which performs precoding in order to minimize complexity and control signaling overhead uses a codebook based precoding scheme. A codebook includes a number of precoding vectors/matrices predetermined between a transmitting side and a receiving side according to a transmission rank and the number of antennas. The receiving side estimates the state of a channel between the transmitting side and the receiving side using a reference signal transmitted by the transmitting side and transmits channel state information to the transmitting side. The transmitting side selects a specific precoding vector/matrix within the codebook according to the channel state information received from the receiving side to perform precoding on a transmission signal. The transmitting side then transmits the precoded transmission signal to the receiving side.

FIG. 1 is a diagram explaining a basic concept of codebook based precoding.

According to a codebook based precoding scheme, a transmitting side and a receiving side share codebook information including a predetermined number of precoding matrices according to a transmission rank and the number of antennas. The receiving side may measure a channel state through a received signal and may feed information about preferred precoding matrices based on the codebook information back to the transmitting side. Although FIG. 1 shows transmission of the information about the preferred precoding matrices by the receiving side to the transmitting side in units of codewords, the present invention is not limited thereto. When the receiving side transmits the information about the preferred precoding matrices to the transmitting side, precoding matrices other than optimal precoding matrices may be used for precoding of data transmitted by the transmitting side to the receiving side. However, such case is advantageous in that feedback overhead is reduced.

Upon reception of the feedback information from the receiving side, the transmitting side may select a specific precoding matrix from a codebook based on the received information. Then the transmitting side performs precoding by multiplying the selected precoding matrix by layer signals corresponding in number to the transmission rank. The transmitting side may transmit the precoded transmission signal to the receiving side through a plurality of antennas. Upon receiving the precoded transmission signal from the transmitting side, the receiving side performs an inverse process of precoding to restore a reception signal. Generally, the precoding matrix satisfies the condition of a unitary matrix U, such as $U*U^H=I$. The inverse process of precoding may be performed by multiplying a Hermitian $P^H$ of a precoding matrix P used for precoding of the transmitting side by the reception signal.

Meanwhile, with advances in technology, the number of antennas which can be included in the transmitter has increased. However, if the number of transmission antennas increases, the size of a codebook increases and thus the amount of data which should be fed back also increases. Further, reception capabilities vary according to codebook design scheme. Therefore, the codebook should be designed so as to exhibit superior reception capabilities at the receiving side. In addition, a proper feedback scheme is needed which can reduce the amount of data fed back to the transmitting side.

SUMMARY OF THE INVENTION

An object of the present invention is to provide a codebook used for precoding of data by multiple transmission antennas.

Another object of the present invention is to provide a method and apparatus for configuring a precoder, which can reduce feedback overhead from a receiver to a transmitter.

It is to be understood that technical objects to be achieved by the present invention are not limited to the aforementioned technical objects and other technical objects which are not mentioned will be apparent from the following description to the person with an ordinary skill in the art to which the present invention pertains.

To achieve these objects and other advantages and in accordance with the purpose of the invention, as embodied and broadly described herein, a method for transmitting precoding matrix information by a user equipment to a base station in a wireless communication system includes receiving a reference signal from the base station, selecting a precoding matrix for the user equipment from a predefined codebook, using the reference signal, and transmitting first and second codebook indexes indicating the selected precoding matrix to the base station, wherein the first codebook index corresponds to a subgroup to which the selected precoding matrix belongs, among m subgroups each including n precoding matrices included in the predefined codebook, and the second codebook index corresponds to the selected precoding matrix among n precoding matrices in the subgroup to which the selected precoding matrix belongs.

In another aspect of the present invention, a method for configuring a precoding matrix by a base station in a wireless communication system includes receiving first and second codebook indexes from a user equipment, and configuring a precoding matrix for the user equipment from a predefined codebook based on the first and second codebook indexes, wherein the first codebook index corresponds to a subgroup to which the precoding matrix belongs, among m subgroups each including n precoding matrices included in the predefined codebook, and the second codebook index corresponds to the precoding matrix among n precoding matrices in the subgroup to which the precoding matrix belongs.

In a further aspect of the present invention, a user equipment for transmitting precoding matrix information to a base station in a wireless communication system includes a transmitter, and a processor, operatively coupled to the transmitter, configured to control the transmitter, wherein the processor is configured to control to select a precoding matrix for the user equipment from a predefined codebook, using a reference signal received from the base station, and to control the transmitter to transmit first and second codebook indexes indicating the selected precoding matrix to the base station, and wherein the first codebook index corresponds to a subgroup to which the selected precoding matrix belongs, among m subgroups each including n precoding matrices included in the predefined codebook, and the second codebook index corresponds to the selected precoding matrix among n precoding matrices in the subgroup to which the selected precoding matrix belongs.

In another aspect of the present invention, a base station for configuring a precoder in a wireless communication system includes a receiver, and a processor, operatively coupled to the receiver, configured to control the receiver, wherein the processor is configured to select a precoding matrix for a user equipment from a predefined codebook based on first and second codebook indexes received from the user equipment and control the receiver to configure a precoder for the user equipment according to the selected precoding matrix, and wherein the first codebook index corresponds to a subgroup to which the precoding matrix belongs, among m subgroups each including n precoding matrices included in the predefined codebook, and the second codebook index corresponds to the precoding matrix among n precoding matrices in the subgroup to which the precoding matrix belongs.

One first codebook index may be transmitted from the user equipment to the base station for a downlink system bandwidth, and at least one second codebook index may be transmitted from the user equipment to the base station for at least one subband in the downlink system bandwidth.

One second codebook index may be transmitted from the user equipment to the base station for each subband in the downlink system bandwidth.

The second codebook index may be transmitted to the base station from the user equipment at a second interval, and the first codebook index may be transmitted to the base station at a first interval which is equal to a positive integer times the second interval.

The aforementioned technical solutions are only a part of the embodiments of the present invention, and various modifications to which technical features of the present invention are applied could be understood by the person with ordinary skill in the art to which the present invention pertains, based on the following detailed description of the present invention.

According to embodiments of the present invention, data transmission efficiency by a large number of transmission antennas can be increased by using the codebook according to the embodiments of the present invention.

Further, the amount of data necessary for feeding information used to determine a precoding matrix back to a transmitter by a receiver can be decreased.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
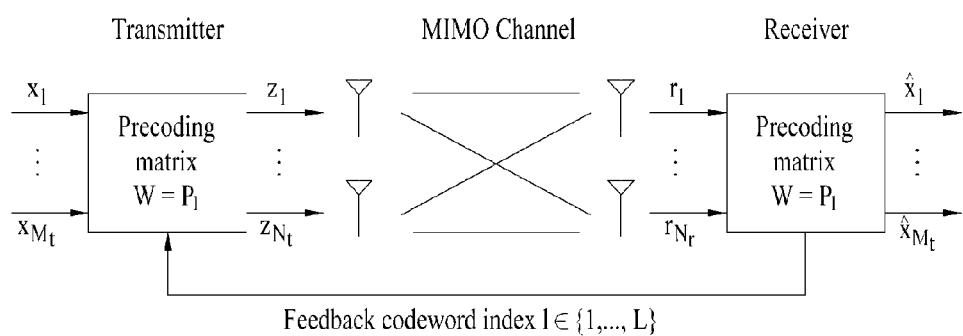
FIG. 1 is a diagram explaining a basic concept of codebook based precoding.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an Evolved-NodeB (eNB), a Base Transceiver System (BTS), and an Access Point (AP).

Hereinafter, in the present invention, if a specific signal is allocated to frame/subframe/slot/symbol/carrier/subcarrier, it means that the specific signal is transmitted through the corresponding carrier/subcarrier during a period/timing of the corresponding frame/subframe/slot/symbol.

In the present invention, rank or transmission rank refers to the number of layers multiplexed/allocated to one OFDM symbol or one data Resource Element (RE).

In the present invention, a subband refers to a set of a predefined number of contiguous Physical Resource Blocks (PRBs), wherein the predefined number varies according to system bandwidth. A wideband refers to a set of subbands spanning an entire DL system bandwidth or an entire UL system bandwidth. Hereinafter, feedback, performed by a UE, of single channel information about the entire DL system bandwidth allocated to the UE is referred to as wideband feedback, and feedback of channel information for each subband present in the system bandwidth is referred to as subband feedback. That is, feedback of channel information with respect to each subband is referred to as subband feedback, and feedback of single channel information representative of channel information of all subbands which are present in the system bandwidth is referred to as wideband feedback.

In addition, configuring a specific precoder means that, from the viewpoint of a transmitting side, the transmitting side configures a precoder so as to precode transmission data using a specific precoding matrix, and that, from the viewpoint of a receiving side, the receiving side selects a specific precoding matrix to be recommended to the transmitting side through feedback.

Meanwhile, PDCCH (Physical Downlink Control CHannel)/PCFICH (Physical Control Format Indicator CHannel)/PHICH (Physical Hybrid-ARQ Indicator CHannel)/PDSCH (Physical Downlink Shared CHannel)/DRS (Dedicate Reference Signal)/CRS (Common Reference Signal)/DMRS (De-Modulation Reference Signal)/CSI-RS (Channel State Information Reference Signal) RE represents an RE assigned to or available for PDCCH/PCFICH/PHICH/PDSCH/DRS/CRS/DMRS/CSI-RS. In particular, a resource element (RE) carrying a reference signal shall be named RS RE and a resource element (RE) carrying control information or data shall be named data RE.

Hereinafter, symbol/carrier/subcarrier to which DRS/CRS/DMRS/CSI-RS is assigned is referred to as DRS/CRS/DMRS/CSI-RS symbol/carrier/subcarrier. For example, a symbol to which DRS is assigned is referred to as a DRS symbol, and a subcarrier to which DRS is assigned is referred to as a DRS subcarrier. Besides, a symbol to which user data (for example, PDSCH data, PDCCH data, and etc.) is assigned is referred to as data symbol, and a subcarrier to which user data is assigned is referred to as data subcarrier.

An RS refers to a predefined signal with a special waveform known to both the BS and the UE, transmitted from the BS to the UE or from the UE to the BS. An RS is also called a pilot signal. Various types of RSs are transmitted between a BS and a UE for the purposes of interference mitigation, estimation of the channel state between the BS and the UE, demodulation of signals transmitted between the BS and the UE, etc. RSs are largely classified into DRSs and CRSs. A CRS is transmitted in every DL subframe in a cell supporting PDSCH transmission. CRSs are used for both purposes of demodulation and measurement and shared among all UEs within the cell. A CRS sequence is transmitted through every antenna port irrespective of layers. A DRS is usually used for demodulation, dedicated to a specific UE. The CRSs and DRSs are also called cell-specific RSs and DMRSs, respectively. The DMRSs are also called UE-specific RSs.

In a 3GPP LTE system supporting up to two layers, a BS simultaneously transmits one or two layers together with DRSs for demodulation of the layers and CRSs for estimation of a channel between a UE and the BS. In CRS based DL transmission, an RS should be transmitted by every physical antenna port. Accordingly, in CRS based DL transmission, overall RS overhead increases as the number of the physical antenna ports increases, thereby lowering data transmission efficiency. To solve this problem, a 3GPP LTE-A system, which can transmit more layers than a 3GPP LTE system, utilizes a DRS as an RS for demodulation instead of a CRS, wherein transmission overhead of the CRS increases as the number of the physical antenna ports increases. In DRS based DL transmission, only a virtual antenna port requires an RS for coherent demodulation. Namely, in DRS based DL transmission, only virtual antenna ports rather than all physical antenna ports of the BS are required to transmit DRSs of the corresponding virtual antennas. Since the number of the virtual antenna ports is generally equal to or less than the number $N_t$ of the physical antenna ports, RS overhead of DRS based DL transmission is relatively reduced compared with RS overhead of CRS based DL transmission.

However, since a DRS using the same precoder as data is used only for demodulation, a Channel State Information RS (CSI-RS), which is an additional RS for measurement, is transmitted to a UE in the 3GPP LTE-A system so that the UE may estimate CSI. Unlike a CRS transmitted in every subframe, the CSI-RS is transmitted at a transmission interval of a plurality of subframes, based on the fact that channel state does not greatly vary over time. Due to such a transmission property of the CSI-RS, CSI-RS transmission overhead is lower than CRS transmission overhead.

A UE according to the exemplary embodiments of the present invention may estimate, using a CRS or CSI-RS for channel estimation, the state of a channel between the UE and a BS which has transmitted the CRS or CSI-RS and may feed CSI back to the BS. Precoding Matrix Information (PMI), Channel Quality Information (CQI), Rank Information (RI), and the like may be fed back as the CSI to the BS from the UE. Since it is difficult for the BS to be aware of DL CSI especially in a Frequency Division Duplex (FDD) system, there is a strong possibility of CSI fed back by the UE being used for DL transmission.

Figure 2:
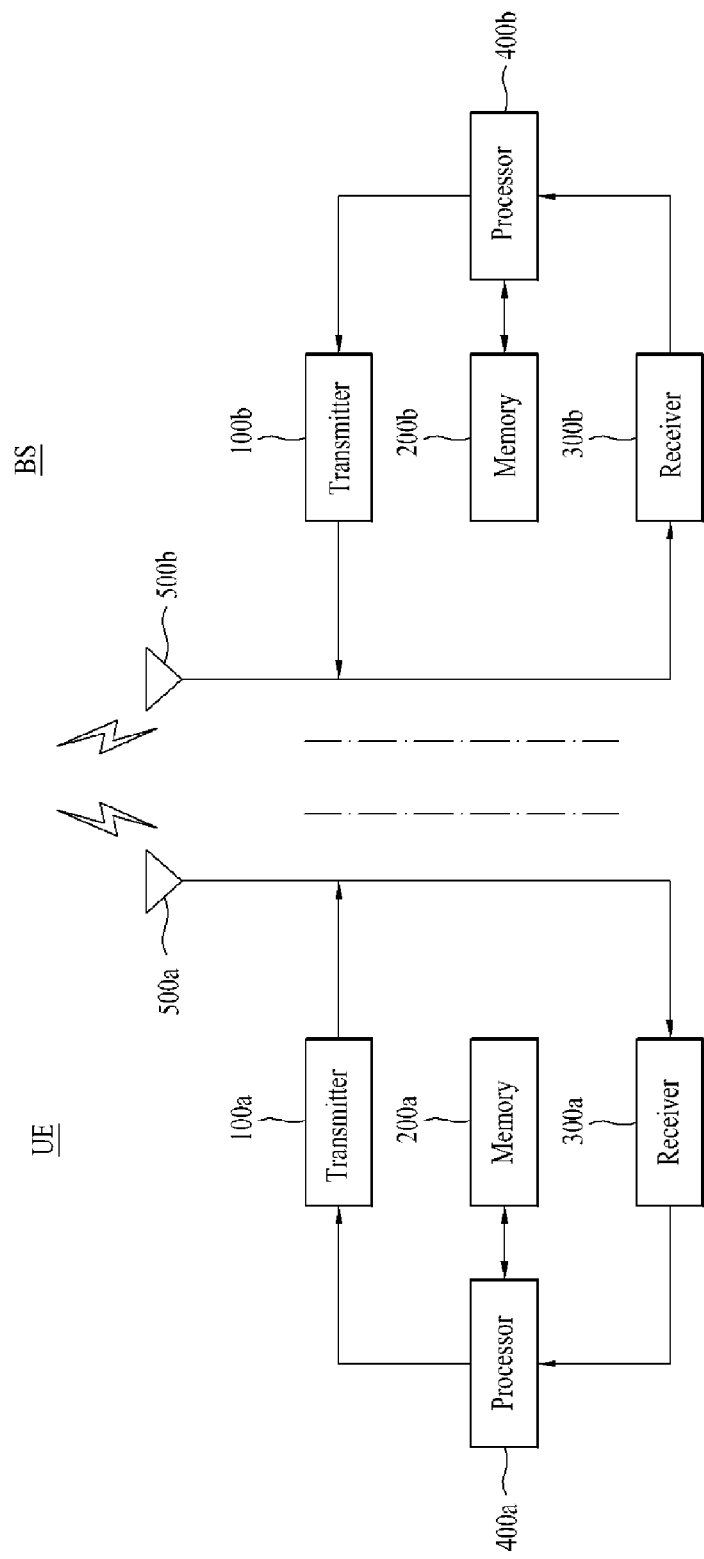
FIG. 2 is a block diagram of a UE and a BS for implementing the present invention.

FIG. 2 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may store codebooks according to the exemplary embodiment of the present invention to be described later. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

According to the exemplary embodiments of the present invention, the UE processor 400a may control the UE receiver 300a to detect an RS for channel estimation transmitted by the BS and may estimate the state of a DL channel between the UE and the BS using the detected RS for channel estimation. The UE processor 400a may generate CSI based on the estimation result according to an exemplary embodiment of the present invention. The UE processor 400a may control the UE transmitter 100a to transmit the CSI to the BS. Especially, the UE processor 400a may configure precoding matrix information, indicating precoding matrices preferred by the UE, as the CSI and may control the UE transmitter 100a to transmit the precoding matrix information to the BS. The UE processor 100a may configure precoding matrix information according to any one of the exemplary embodiments of the present invention to be described later. The UE processor 100a may control the transmitter 100a to transmit the precoding matrix information according to any one of the exemplary embodiments of the present invention to be described later.

The BS processor 400b may configure a precoder, which is to be used for precoding of data to be transmitted to the UE, based on the CSI. The BS processor 400b may configure a precoder according to any one of the exemplary embodiments of the present invention to be described later. The BS transmitter 100b may precode data to be transmitted to the UE using the precoder configured under the control of the BS processor 400b and may transmit the precoded data to the UE.

Figure 3:
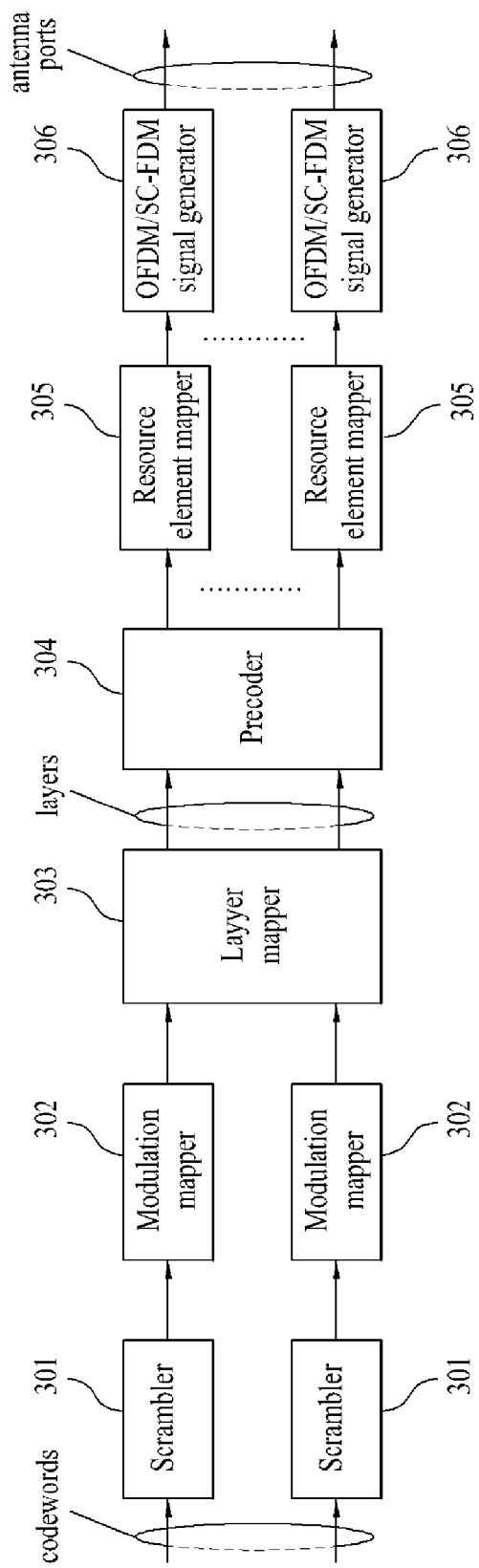
FIG. 3 is a block diagram of an exemplary transmitter in each of the UE and the BS.

FIG. 3 is a block diagram of an exemplary transmitter in each of the UE and the BS. Operations of the transmitters 100a and 100b will be described below in more detail with reference to FIG. 3.

Referring to FIG. 3, each of the transmitters 100a and 100b include scramblers 301, modulation mappers 302, a layer mapper 303, a precoder 304, RE mappers 305, Orthogonal Frequency Division Multiplexing/Single Carrier Frequency Division Multiplexing (OFDM/SC-FDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-$N_t$ in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. In this case, $N_t$ corresponds to the number of transmission antennas, and $M_t$ corresponds to a transmission rank R which is the number of transmission layers. The BS processor 400b may control the BS transmitter 100b to configure the precoder 304 based on transmitted precoding matrix information according to an exemplary embodiment of the present invention. That is, the BS processor 400b may control the BS transmitter 100b to configure the precoder 304 by configuring the precoding matrix W according to an exemplary embodiment of the present invention.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM/SC-FDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM/SC-FDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$ to a receiver after digital-to-analog conversion, frequency upconversion, etc. The OFDM/SC-FDM signal generators 306 may include an IFFT module, a CP inserter, a Digital-to-Analog Converter (DAC), a frequency upconverter, etc.

If the transmitters 100a and 100b adopt SC-FDMA for transmitting a codeword, the transmitters 100a and 100b include an FFT processor (not shown). The FFT processor performs FFT on the complex modulation symbols for each antenna and outputs the FFT symbol to the RE mappers 305.

The receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas.

A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

Channel information being used to select a precoding matrix which has been used in a transmission layer (or layers) is information which has been known to the UE. However, if the UE uses a CRS upon demodulating data received from a BS, since the UE is not aware of a precoding matrix which has been actually applied to the transmission layer (or layers) by the BS even though the UE receives the data transmitted by the BS, the BS informs the UE of information about the precoding matrix during transmission of DL data. When the UE demodulates the received data using a UE-specific RS (also referred to as a DMRS), the BS precodes the UE-specific RS using the precoding matrix used for transmission of each layer. Therefore, when the UE estimates the state of a channel through which the transmission layer (or layers) is transmitted using the UE-specific RS, it means that the UE estimates a channel to which precoding has already been applied. Thus, in the case where the UE demodulates the received data using the UE-specific RS, even if the BS does not additionally provide precoding information used for transmission of the layer (or layers), the UE can decode the received data. Namely, if the CRS is used for demodulating the received data, the UE can restore the transmission layer (or layers) from antenna specific symbols using the precoding matrix informed by the BS. The restoration of the transmission layer (or layers) from the antenna specific symbols using the precoding matrix may be performed by a multiplexer which is configured to perform an inverse process of the precoder 304 of the transmitter.

If the receivers 300a and 300b receive signals transmitted by SC-FDMA, each of the receivers 300a and 300b further includes an IFFT module. The IFFT module IFFT-processes the antenna-specific symbols recovered by the RE demapper and outputs the IFFT symbol to the multiplexer.

While it has been described in FIGS. 2 and 3 that each of the transmitters 100a and 100b includes the scramblers 301, the modulation mappers 302, the layer mapper 303, the precoder 304, the RE mappers 305, and the OFDM/SC-FDM signal generators 306, it may be further contemplated that the scramblers 301, the modulation mappers 302, the layer mapper 303, the precoder 304, the RE mappers 305, and the OFDM/SC-FDM signal generators 306 are incorporated into each of the processors 400a and 400b of the transmitters 100a and 100b. Likewise, while it has been described in FIGS. 2 and 3 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For the convenience's sake of description, the following description will be given with the appreciation that the scramblers 301, the modulation mappers 302, the layer mapper 303, the precoder 304, the RE mappers 305, and the OFDM/SC-FDM signal generators 306 are included in the transmitters 100a and 100b configured separately from the processors 400a and 400b that controls their operations, and the signal recoverer, the multiplexer, and the channel demodulator are included in the receivers 300a and 300b configured separately from the processors 400a and 400b that controls their operations. However, it is to be noted that even though the scramblers 301, the modulation mappers 302, the layer mapper 303, the precoder 304, the RE mappers 305, and the OFDM/SC-FDM signal generators 306 are included in the processors 400a and 400b or the signal recoverer, the multiplexer, and the channel demodulator are included in the processors 400a and 400b, embodiments of the present invention are applicable in the same manner.

Figure 4:
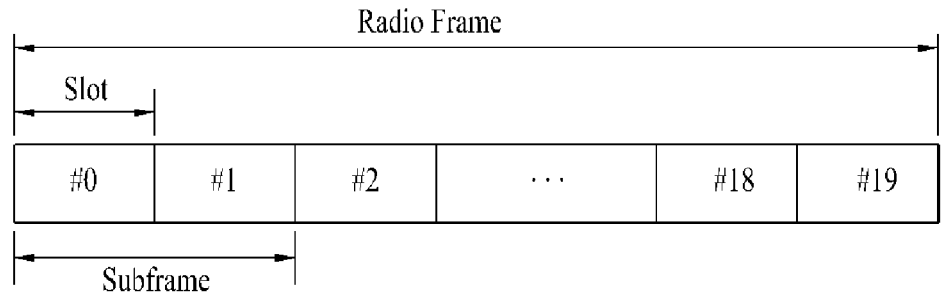
FIG. 4 illustrates an exemplary structure of a radio frame in a wireless communication system.

FIG. 4 illustrates an exemplary structure of a radio frame in a wireless communication system. Specifically, the radio frame is a 3GPP LTE/LTE-A radio frame. The radio frame structure is applicable to a Frequency Division Duplex (FDD) mode, a half FDD (H-FDD) mode, and a Time Division Duplex (TDD) mode.

Referring to FIG. 4, a 3GPP LTE/LTE-A radio frame is 10 ms (307,200$T_s$) in duration. The radio subframe is divided into 10 equally-sized subframes, each subframe being 1 ms long. $T_s$ represents a sampling time and is given as $T_s=1/(2048 \times 15 \text{ kHz})$. Each subframe is further divided into two slots, each of 0.5 ms in duration. 20 slots are sequentially numbered from 0 to 19. A time interval in which one subframe is transmitted is defined as a Transmission Time Interval (TTI).

Figure 5:
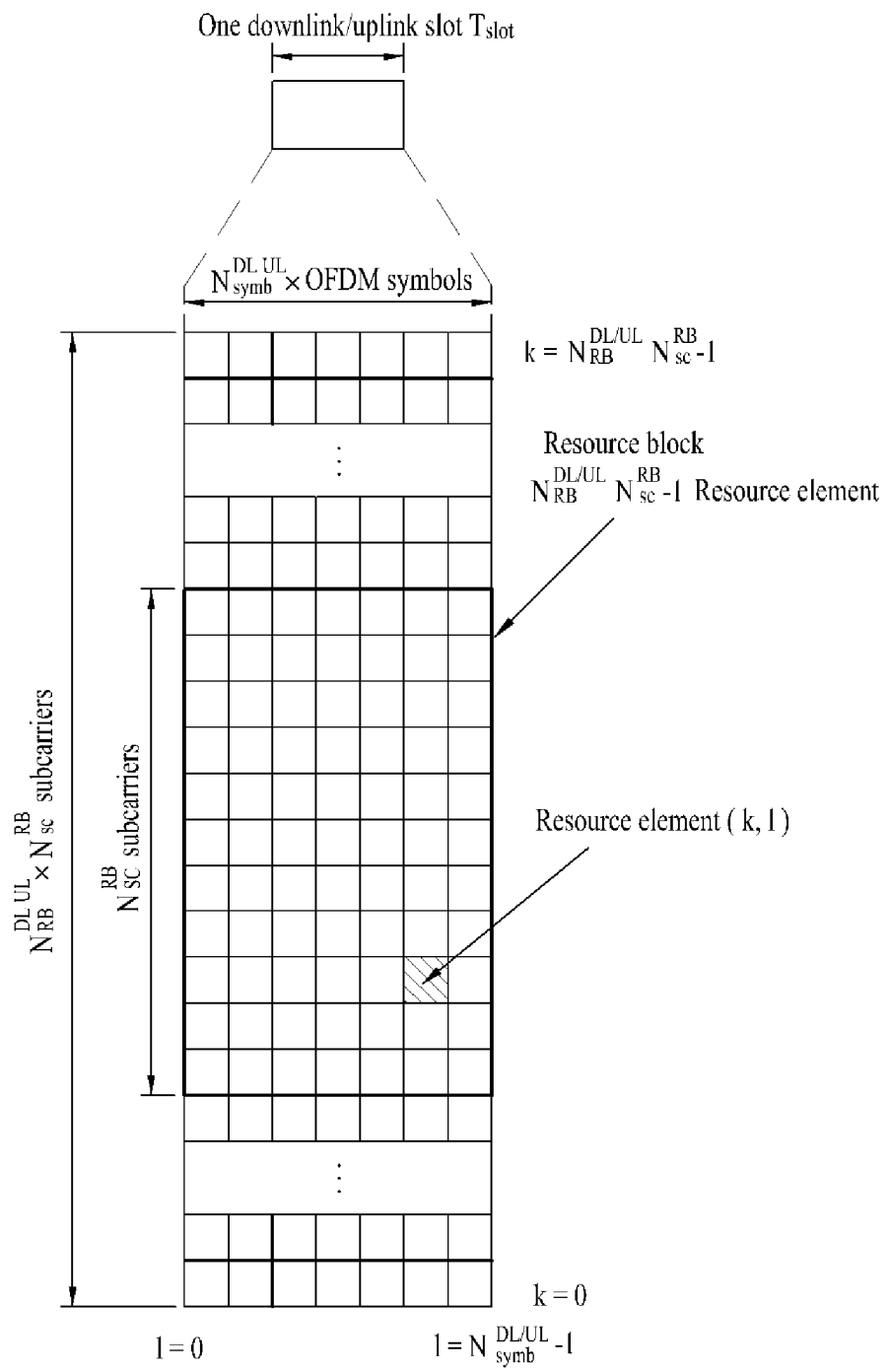
FIG. 5 illustrates an exemplary structure of a DownLink/UpLink (DL/UL) slot in the wireless communication system.

FIG. 5 illustrates an exemplary structure of a DownLink/UpLink (DL/UL) slot in the wireless communication system. Specifically, FIG. 5 illustrates the structure of a resource grid in the 3GPP LTE/LTE-A system. There is one resource grid per antenna port.

Referring to FIG. 5, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 5 as having a slot with 7 OFDM symbols for illustrative purposes, embodiments of the present invention are also applicable to subframes with any other number of OFDM symbols. A resource including one OFDM symbol by one subcarrier is referred to as a Reference Element (RE) or a tone.

Referring to FIG. 5, a signal transmitted in each slot may be described by a resource grid including $N^{DL/UL}_{RB} N^{RB}_{sc}$ sub- carriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb} \times N^{RB}_{sc}$ REs.

Each RE in the resource grid may be uniquely identified by an index pair (k, l) in a slot. k is a frequency-domain index ranging from 0 to $N^{DL/UL}_{RB} \times N^{RB}_{sc} - 1$ and l is a time-domain index ranging from 0 to $N^{DL/UL}_{symb} - 1$.

Figure 6:
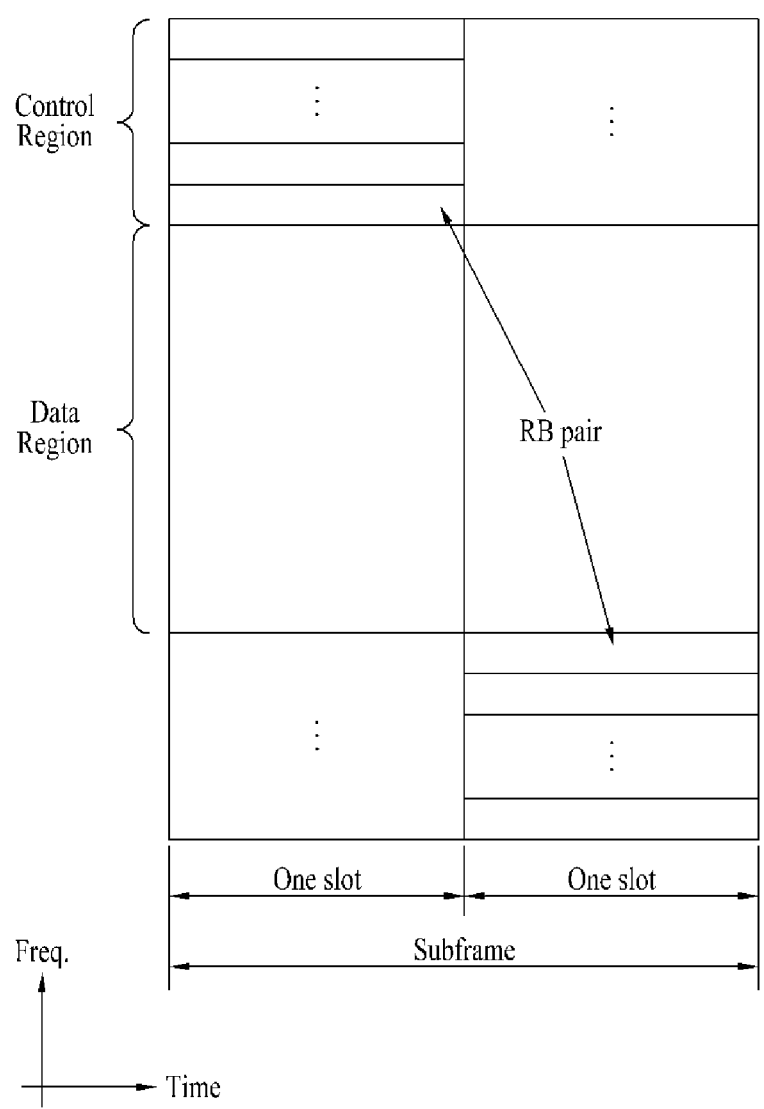
FIG. 6 illustrates an exemplary structure of a UL subframe in the wireless communication system.

FIG. 6 illustrates an exemplary structure of a UL subframe in the wireless communication system.

Referring to FIG. 6, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. If a UE adopts SC-FDMA for uplink transmission, it may not transmit a PUCCH and a PUSCH simultaneously to maintain single carrier characteristics. A PUCCH for a UE is allocated to an RB pair in a subframe. The RBs of the RB pair occupy different subcarriers in two slots. This is called frequency hopping of an RB pair allocated to a PUCCH over a slot boundary.

Table 1 shows a codebook structure used for two transmission antennas (2Tx) in 3GPP LTE release 8.

TABLE 1

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

Referring to Table 1, a 2Tx codebook includes 7 precoding matrices. An identity matrix among the 7 precoding matrices is for an open-loop system and the number of precoding matrices used for precoding of a closed-loop system is 6.

Table 2 shows a codebook structure used for four transmission antennas (4Tx) in 3GPP LTE release 8.

TABLE 2

| Codebook index | $u_n$ | Number of layers | | | |
|---|---|---|---|---|---|
| | | 1 | 2 | 3 | 4 |
| 0 | $u_0 = [1\ -1\ -1\ 1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, 4×4 precoding matrices are generated using Householder transformation and corresponding column subsets of the 4×4 precoding matrices are used for precoding for transmission of a rank of 4 or less. Referring to Table 2, $W_n^{\{s\}}$ may be defined as $W_n = I - 2u_n u_n^H / u_n^H u_n$ (where I denotes a 4×4 identity matrix) with respect to a set including a column referred to as $\{s\}$. As shown in Table 2, a 4Tx codebook includes 16 precoding matrices with respect to each rank and a total of 64 precoding matrices are configured.

For reference, the codebook of Table 1 and the codebook of Table 2 have the following properties in common.

(1) Constant Modulus (CM): Respective elements of all the precoding matrices in each codebook do not include 0 and are configured to have the same size.

(2) Nested property: A precoding matrix for a lower rank is designed to be comprised of a subset of a specific column of a precoding matrix for an upper rank.

(3) Constrained alphabet: Each element of every precoding matrix in each codebook is restricted to a few alphabets. For example, alphabets which can be used as elements of the precoding matrices in the codebook of Table 1 are restricted to $\{\pm 1, \pm j\}$, and alphabets which can be used as elements of the precoding matrices in the codebook of Table 2 are limited to $\{\pm 1, \pm j, \pm(1+j)/\sqrt{2}, \pm(-1+j)/\sqrt{2}\}$. In other words, the precoding matrices of Table 1 are restricted to QPSK alphabet and the precoding matrices of Table 2 are restricted 8 PSK alphabet.

Figure 7:
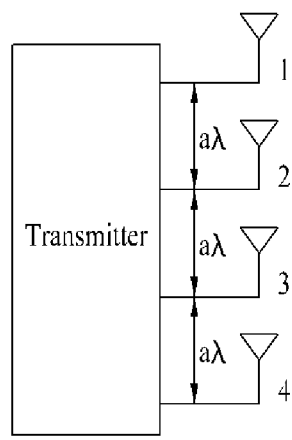
FIG. 7 is a diagram explaining ULA antenna setup and X-pol antenna setup.
Figure 7:
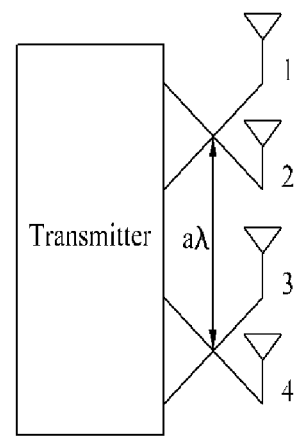

FIG. 7 is a diagram explaining ULA antenna setup and X-pol antenna setup.

The codebook structures of Table 1 and Table 2 are designed to consider a Uniform Linear Array (ULA) antenna setup as illustrated in FIG. 7(a). Generally, the ULA antenna setup requires a large space between antennas in order to keep an antenna correlation below a predefined level. Accordingly, a cross-polarity (X-pol) antenna setup as illustrated in FIG. 7(b) is used in order to use many antennas such as 4Tx or 8Tx. In the case of the X-pol antenna setup, antenna space can be decreased compared with the ULA antenna setup because high data throughput can be achieved by reducing the antenna correlation even if a distance between antennas is relatively short. Accordingly, a precoder configuration method and feedback method suitable for a system of the X-pol antenna setup are proposed hereinafter. Meanwhile, the codebook structures of Table 1 and Table 2 support systems including only a maximum of 4 antennas. Hereinafter, a method for configuring a codebook for systems including antennas, especially, more than 4 antennas and associated embodiments, and a method for configuring a precoding matrix using the codebook, a feedback method and associated embodiments are proposed.

<Predefined Codebook Structure>

—Householder Based Codebook—

As shown in Table 2, a precoding vector $u_i$ (where i is a codebook index) having n elements is defined and an n×n precoding matrix may be configured from the precoding vector $u_i$ using Householder transformation. A column subset of the n×n precoding matrix may be used for precoding for transmission of a rank of n or less.

A UE may feed CSI, which is considered for a BS to select a precoding matrix to be used when the BS transmits user data for the UE, back to the BS. For example, the UE may estimate a channel state (or measure a channel) based on a DL RS transmitted by the BS and transmit precoding matrix information indicating one or more precoding matrices preferred by the UE based on the estimated (or measured) channel state to the BS as CSI. The BS may select a precoding matrix from a codebook based on the CSI fed back by the UE. For example, referring to Table 2, the BS constructing 4Tx antennas may configure a 4×4 precoding matrix using a precoding vector corresponding to one of the 16 codebook indexes. A column subset of the 4×4 precoding matrix is configured as the precoder 404 of the BS according to the number of layers that the BS desires to transmit.

DFT Matrix Based Codebook

Using a Discrete Fourier Transform (DFT) matrix or a Walsh matrix, a precoder may be configured according to the number of antennas. Alternatively, a variety of precoding matrices may be configured by combining the DFT matrix or the Walsh matrix with a phase shift matrix, a phase shift diversity matrix, etc.

An n×n DFT matrix (hereinafter, DFTn) may be defined as follows:

$$D_n(k, l) = \frac{1}{\sqrt{n}} \exp(-j2\pi kl/n),$$ [Math Figure 1]

$$k, l = 0, 1, \ldots, n-1$$

Only one DFT matrix exists with respect to a specific size n. Accordingly, various precoding matrices should be defined according to channel states in order to properly use precoding matrices according to circumstances. A variety of precoding matrices may be additionally configured by rotating a DFTn matrix. For example, a rotated DFTn matrix may be defined as follows:

$$D_n^{(G,g)}(k,l) = \frac{1}{\sqrt{n}}\exp(-j2\pi k(l+g/G)/n), \quad \text{[Math Figure 2]}$$
$$k,l = 0,1,\ldots,n-1, \quad g = 0,1,\ldots,G$$

According to Math Figure 2, G rotated DFTn matrices satisfying the characteristic of the DFT matrix may be generated.

<Multi-Codebook Based Precoder>

Multi-Codebook Based Precoder 1

A BS may configure an $N_t \times R$ precoding matrix in order to transmit R layers (or rank R) through $N_t$ transmission antennas. The BS may configure the $N_t \times R$ precoding matrix based on precoding matrix information fed back by the UE. The following Math Figure shows an example of an $N_t$-Tx codebook for rank R, comprised of $n_c$ matrices.

$$P_{N_t \times R}(k) \in \{P_1^{N_t \times R}, P_2^{N_t \times R}, P_3^{N_t \times R}, \ldots, P_{n_c}^{N_t \times R}\} \quad \text{[Math Figure 3]}$$

In Math Figure 3, k denotes an index of a specific resource which may be a subcarrier or virtual resource index or a subband index.

The codebook of Math Figure 3 may be constructed as follows:

$$P_{N_t \times R}(k) = \begin{bmatrix} P_{M_t \times R,1} \\ P_{M_t \times R,2} \end{bmatrix}, \quad N_t = 2 \cdot M_t \quad \text{[Math Figure 4]}$$

In Math Figure 4, $P_{Mt \times R,2}$ may be configured to have a form obtained by shifting $P_{Mt \times R,1}$ by a specific complex weight. Therefore, when using specific complex weights $w_1$ and $w_2$, $P_{Mt \times R,1}$ and $P_{Mt \times R,2}$ may be expressed as follows:

$$P_{N_t \times R}(k) = \begin{bmatrix} w_1 \cdot P_{M_t \times R,1} \\ w_2 \cdot P_{M_t \times R,1} \end{bmatrix} \quad \text{[Math Figure 5]}$$

In Math Figure 5, $w_2 \cdot P_{Mt \times R,2}$ is obtained by shifting $w_1 \cdot P_{Mt \times R,1}$ by as $w_2/w_1$. Thus, a precoding matrix configured to have a correlation between elements of a specific column or row is also called a partition based precoding matrix or a stacking based precoding matrix.

The precoding matrix contained in the codebook of Math Figure 5 may be expressed by the following Math Figure using the Kronecker product.

$$P_{N_t \times R,n,m}(k) = \begin{bmatrix} w_1 \\ w_2 \end{bmatrix} \otimes P_{M_t \times R,1} = W_n \otimes P_m \quad \text{[Math Figure 6]}$$

A UE may feed information indicating a partial matrix $W = [w_1 \ w_2]^T$ of a precoding matrix $P_{Nt \times R,n,m}$ preferred by the UE back to the BS, separately from information indicating another partial matrix $P = P_{Mt \times R,1}$ of the precoding matrix $P_{Nt \times R,n,m}$. The BS may configure a precoding matrix according to the exemplary embodiment of Math Figure 5 or Math Figure 6 using the feedback information transmitted by the UE. Namely, the BS processor 400b may control the BS transmitter 100b to configure the precoder 304 having the precoding matrix as shown in Math Figure 5 or Math Figure 6.

In Math Figure 5 or Math Figure 6, W is always configured as a 2×1 vector. W may be defined in form of a codebook as follows:

$$W \in \begin{bmatrix} 1 \\ e^{j\frac{2\pi}{N}i} \end{bmatrix}, \quad i = 0,\ldots,N-1 \quad \text{[Math Figure 7]}$$

In Math Figure 7, N is the number of precoding vectors contained in the codebook W and i may be used as a vector index. To obtain proper precoding capabilities while minimizing feedback overhead, i may be limited to powers of 2 such as $2^1=2$, $2^2=4$ or $2^3=8$. In addition, $P_{Mt \times R,1}$ may be configured as a 2Tx codebook or a 4Tx codebook. For example, $P_{Mt \times R,1}$ may be configured as shown in Table 1 or Table 2. Alternatively, $P_{Mt \times R,1}$ may be configured as a rotated DFTn.

Figure 8:
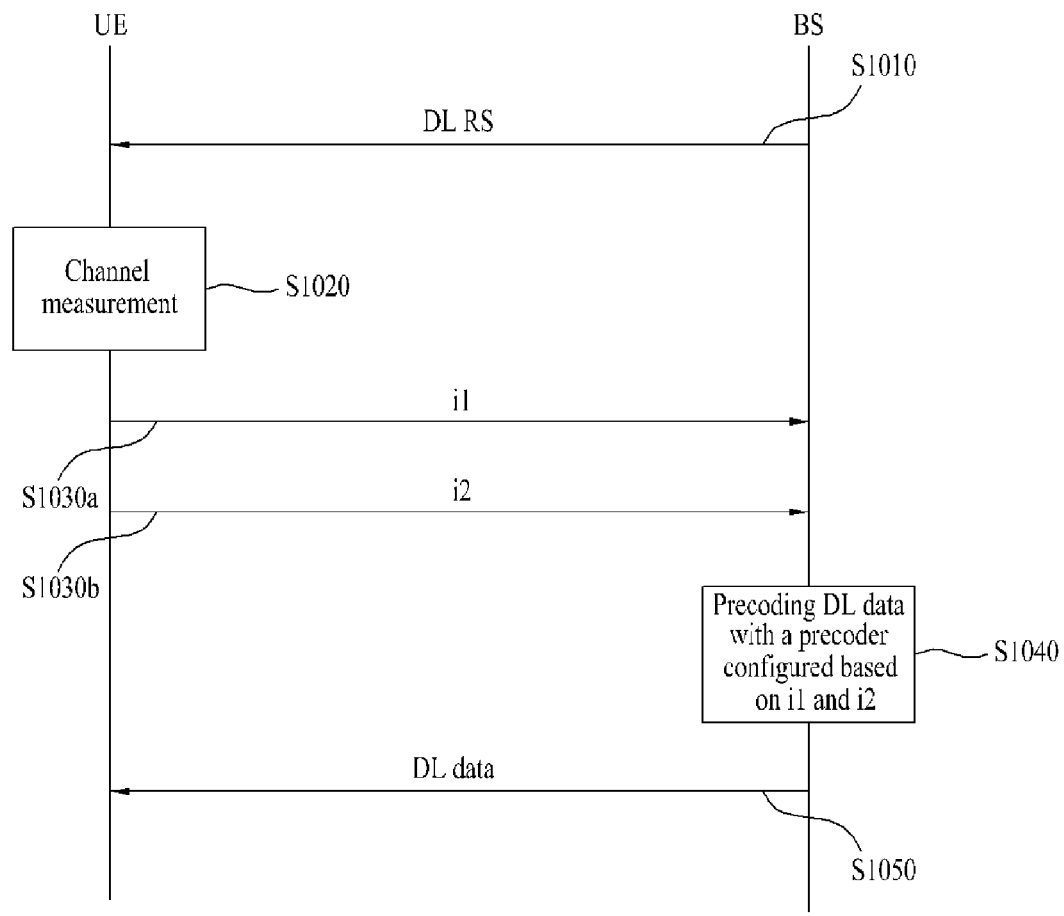
FIG. 8 is a flowchart illustrating DL data transmission according to exemplary embodiments of the present invention.

Meanwhile, W may be configured by 2×2 matrices. For instance, a precoder may be configured according to a codebook using the 2×2 matrix W.

$$P_{N_t \times 2R,n,m}(k) = \begin{bmatrix} w_1 & w_3 \\ w_2 & w_4 \end{bmatrix} \otimes P_{M_t \times R,1} = W_n \otimes P_m, \quad \text{[Math Figure 8]}$$
$$N_t = 2 \cdot M$$

According to the exemplary embodiment of Math Figure 8, a precoder which supports a transmission rank up to a maximum of 2R may be configured using $P_{Mt \times R,1}$ which supports a maximum transmission rank of R. For example, if $P_{Mt \times R,1}$ is defined as the codebook of Table 2, a transmission rank up to a maximum of 4 may be supported according to the exemplary embodiment of Math Figure 6. However, according to the exemplary embodiment of Math Figure 8, the maximum transmission rank which can be supported is 2R, that is, 8. Hence, according to the exemplary embodiment of Math Figure 8, a precoder supporting 8×8 transmission may be configured using the previously configured 4Tx codebook in a system including 8 transmission antennas.

In Math Figure 8, W may be defined in form of a codebook as follows:

$$W \in \begin{bmatrix} 1 & 1 \\ e^{j\frac{2\pi}{N}i} & -e^{j\frac{2\pi}{N}i} \end{bmatrix}, \quad i = 0,\ldots,N-1 \quad \text{[Math Figure 9]}$$

Meanwhile, a precoder for 8×8 transmission may be configured as follows:

$$P_{N_t \times 2R,n,m}(k) = W_n \cdot P_m \quad \text{[Math Figure 10]}$$

In Math Figure 10, $W_n$ is defined as follows:

$$W_n = \begin{bmatrix} X^{(n)} & 0 \\ 0 & X^{(n)} \end{bmatrix}, \quad W_n \in \{W_0, W_1, W_2, W_3\} \quad \text{[Math Figure 11]}$$

-continued $$X^{(n)} = \frac{1}{2} \times \begin{bmatrix} 1 & 0 & 0 & 0 \\ 0 & (j)^n & 0 & 0 \\ 0 & 0 & (-1)^n & 0 \\ 0 & 0 & 0 & (-j)^n \end{bmatrix}$$

$$\begin{bmatrix} 1 & 1 & 1 & 1 \\ 1 & e^{j\frac{\pi}{8}} & e^{j(2)\frac{\pi}{8}} & e^{j(3)\frac{\pi}{8}} \\ 1 & e^{j(2)\frac{\pi}{8}} & e^{j(2)(2)\frac{\pi}{8}} & e^{j(3)(2)\frac{\pi}{8}} \\ 1 & e^{j(3)\frac{\pi}{8}} & e^{j(2)(3)\frac{\pi}{8}} & e^{j(3)(3)\frac{\pi}{8}} \end{bmatrix}, \quad n = 0, 1, 2, 3$$

In Math Figure 10, $P_m$ is defined as indicated in Math Figure 12 with respect to rank-1 and as indicated in Math Figure 13 with respect to rank-2.

$$P_m \in CB_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\}$$ [Math Figure 12]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

$$P_m \in CB_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\}$$ [Math Figure 13]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\}$$

In Math Figure 12 and Math Figure 13, $CB_2$ denotes a second codebook. The codebook W, which is a set of a W matrix $W_n$, corresponds to a first codebook $CB_1$.

As another example, a precoder may be configured as a block diagonal matrix and a phase vector.

$$P_{N_t \times 2R, n, m}(k) = W_n \cdot P_m = \begin{bmatrix} \tilde{w} & 0 \\ 0 & \tilde{w} \end{bmatrix} \begin{bmatrix} 1 \\ \alpha \end{bmatrix},$$ [Math Figure 14]

$$\alpha \in \{1, -1, j, -j\}$$

In Math Figure 14, an antenna group beam satisfies $\tilde{W}$ and $\tilde{W} \in G^{(1,2)}$ and $G^{(k,Q)}$ is defined as follows:

$$G^{(k,Q)} = \bigcup_{q=0}^{Q-1} G_q^{(k,Q)}$$ [Math Figure 15]

In Math Figure 15, $G_q^{(k,Q)}$ represents a set of column subsets comprised of k columns within a DFT based generator matrix $G_q^{(Q)}$ having elements indicated in the following Math Figure 16.

$$[G_q^{(Q)}]_{mn} = \exp\left( j \frac{2\pi}{N_T/2} m\left(n + \frac{q}{Q}\right) \right),$$ [Math Figure 16]

$$q = 0, 1, \ldots, Q-1$$

The embodiment of Math Figure 6 and the embodiments of Math Figure 8 to Math Figure 16 may be differently applied according to each rank. For example, the embodiment of Math Figure 6 may be used to configure a codebook for $R \leq 4$ and the embodiments of Math Figure 8 to Math Figure 16 may be used to configure a codebook for $R \geq 5$. Alternatively, a codebook for $R=1$ may be configured according to the embodiment of Math Figure 6 and a codebook for the other transmission ranks may be configured according to one of the embodiments of Math Figure 8 to Math Figure 16.

Multi-Codebook Based Precoder: Nested Property

A codebook may be configured using the embodiment of Math Figure 6 and one of the embodiments of Math Figure 8 to Math Figure 16. However, if two embodiments are not used together, precoders for all transmission ranks cannot be configured. As an example, a codebook for a transmission rank greater than R cannot be defined using only the embodiment of Math Figure 6. Namely, a precoder for a transmission rank greater than R cannot be configured only by Math Figure 6. To solve such a problem, the following Math Figure may be defined to configure a precoder:

$$P_{N_t \times N_t, n, m} = \begin{bmatrix} w_1 & w_3 \\ w_2 & w_4 \end{bmatrix} \otimes P_{M_t \times M_t} = W_n \otimes P_m, \quad N_t = 2 \cdot M$$

Precoding matrices in which $R=N_t$ may be configured using $P_{Nt \times Nt}$ obtained from Math Figure 17. A column subset of the precoding matrix in which $R=N_t$ may be used to configure a precoding matrix for a lower rank less than the number $N_t$ of antennas. If a precoding matrix for a lower rank is comprised of a specific column subset of a precoding matrix for a higher rank, it is said that a corresponding codebook has a nested property. When configuring a codebook to have the nested property, CQI calculation is simplified because a column subset for a higher rank is a precoding matrix of a lower rank.

In Math Figure 17, $P_{Nt \times Nt, n, m}$ denotes precoding matrices when $R=N_t$. For example, if it is assumed that a precoding matrix for transmission of rank 2 in a system in which $N_t \geq 2$ is expressed as $P_{Nt \times Nt, n, m}(0,2)$, then a precoder configured according to $P_{Nt \times Nt, n, m}(0,2)$ may be designed to have a precoding matrix comprised of the zeroth and second columns among $N_t$ column vectors of $P_{Nt \times Nt, n, m}$.

In Math Figure 17, $P_{Mt \times Mt}$ may be configured as a rotated DFT matrix or another type of codebook.

Open-Loop Precoder Cycling

To raise a diversity gain in open-loop environments, the above-described precoding matrices may be modified according to a specific radio resource. For example, the codebook of Math Figure 6 may be modified as follows according to an index k of a specific resource region:

$$P_{N_t \times R, n, m}(k) = W_{k \bmod n_c} \otimes P_{k \bmod m_c}$$ [Math Figure 18]

As indicated in Math Figure 18, a precoding matrix for a specific resource region k may be determined by a modulo operation. In Math Figure 18, $n_c$ and $m_c$ may indicate the size of a W codebook containing W matrices and the size of a P codebook containing P matrices, respectively, or may indicate the size of a subset of the W codebook and the size of a subset of the P codebook, respectively. If both matrices are cycled as in Math Figure 18, diversity gain can be maximized but the complexity of the configuration of a precoder increases. Accordingly, a precoder may be configured such that one of the W and P matrices is cycled at a long-term interval and the other matrix is cycled at a short-term interval. For example, the W matrix may be determined by a modulo operation according to a PRB index and the P matrix may be determined by a modulo operation according to a subframe index. Alternatively, the W matrix may be determined by a modulo operation according to a PRB index and the P matrix may be determined by a modulo operation according to a subband index. The P matrix and the W matrix may also be determined by the inverse of the above case.

Meanwhile, the precoder may be configured such that precoder cycling using a modulo operation is applied to only one of the two matrices and the precoder cycling is not applied to the other matrix.

In the above-described embodiments, the W and P matrices may be configured to have the following properties.

TABLE 3

| Case | W/P |
|---|---|
| Alphabet restriction 1 | Alphabets of W matrix are restricted to BPSK and alphabets of P matrix are restricted to QPSK or 8 PSK. |
| Alphabet restriction 2 | Alphabets of W matrix are restricted to QPSK and alphabets of P matrix are restricted to QPSK or 8 PSK. |

Feedback for Configuring Multi-Codebook Based Precoder

In the multi-codebook based precoder described in conjunction with Math Figure 3 to Math Figure 18, W and P should be specified. A UE may configure CSI indicating W and P so as to have the following properties and may feed the CSI back to a BS. If information indicating W is i1 and information indicating P is i2, then i1 and i2 may be fed back so as to have the following properties.

TABLE 4

| Case | i1/i2 |
|---|---|
| Frequency granularity 1 | One of i1 and i2 is fed back for a subband and the other is fed back for a wideband. |
| Frequency granularity 2 | One of i1 and i2 is fed back with respect to best-M subbands and the other is fed back for a wideband. |
| Time granularity | One of i1 and i2 is fed back at intervals of N1 and the other is fed back at intervals of N2 |
| Feedback channel 1 | One of i1 and i2 is fed back on PUSCH and the other is fed back on PUCCH |
| Feedback channel 2 | When PUSCH is used, one (e.g., i1) is fed back per subband and the other (e.g., i2) is fed back for a wideband. When PUCCH is used, both i1 and i2 are fed back for a wideband. |
| Feedback channel 3 | When PUSCH is used, one (e.g., i1) is fed back per subband and the other (e.g., i2) is fed back for a wideband. When PUCCH is used, one (e.g., i1) is fed back for a wideband and the other (e.g., i2) is fed back for a specific subband. |
| Feedback channel 4 | One of W and P is configured as a fixed matrix in a specific feedback channel or mode. Then, information indicating the fixed matrix does not need feedback. |
| Unequal protection | One (e.g., i1) is coded at code rate having higher reliability and the other (e.g., i2) is coded at code rate having lower reliability. |

A BS may configure a precoder for data to be transmitted to the UE according to one of the above-described embodiments of Math Figures 6, 8, 11, 14, 17, and 18, based on the CSI fed back by the UE.

For example, assuming that W is a codebook for long-term/wideband precoding and P is a codebook for short-term/subband precoding, i1 may be fed back for a wideband at a long-term interval and i2 may be fed back for a subband at a short-term interval.

Referring to FIG. 7(b), a codebook configured according to the exemplary embodiments of the present invention may be applied to the X-pol antenna setup. Since antennas within a co-polarized antenna group are closely located, a high correlation is expected between channels formed by antennas within one antenna group and by a receiving side. In contrast, a low correlation is expected between channels formed by antennas within different co-polarized antenna groups and by the receiving side. Since a wideband beam is suitable for a channel having a high correlation, the W matrix is suitable to form a beam for each co-polarized antenna group and the P matrix may be used to adjust a beam in each subband. In the case where mobile speed of the UE is low, since the direction of a beam is not dynamically changed, the W matrix may be updated less frequently compared with the P matrix. i1 may be transmitted to the BS as a long-term wideband feedback form and i2 may be transmitted to the BS as a short-term subband feedback form. If i1 and i2 are fed back in different subframes, there is possibility of error propagation in which the subsequent i2 information transmitted at a short-term interval cannot be used when an error is generated in the i1 information transmitted at a long-term interval. Accordingly, i1 indicating the W matrix is desired to be fed back with high reliability compared with i2 indicating the P matrix.

As described previously, if a precoder is configured by a combination of the W matrix and the P matrix, the number of W matrices and the number of P matrices, which can be fed back by the UE, among the W codebook including $n_c$ precoding matrices and the P codebook including $m_c$ precoding matrices may be restricted to $n_s$ ($n_s \leq n_c$) and/or $m_s$ ($m_s \leq m_c$). $n_s$, $n_c$, $m_s$, and $m_c$ are positive integers. The BS may transmit codebook subset information indicating feedback allowable/non-allowable precoding matrices within the W codebook and/or the P codebook to the UE. Alternatively, the codebook subset information may be predefined according to a CSI feedback mode. The UE may select precoding matrices for the UE only from among the feedback allowable precoding matrices based on the codebook subset information and feed precoding matrix information indicating the selected precoding matrices back to the BS. Since the UE and the BS already know the codebook subset, the UE may feed the precoding matrix information back to the BS in a form indicating the selected precoding matrices within the codebook subset. For example, if the number of feedback allowable precoding matrices among precoding matrices within the W codebook is $n_s$ and the number of feedback allowable precoding matrices among precoding matrices within the P codebook is $m_s$, the UE may configure it using bits of ceiling{ $\log_2(n_s)$} and transmit i1 to the BS, and configure i2 using bits of ceiling{ $\log_2(m_s)$} and transmit i2 to the BS.

<Multi-Stage Codebook Based Precoder>

According to the exemplary embodiments of the present invention of Math FIGS. 6, 8, 11, 14, 17, and 18, a precoder is configured as a combination of the P matrix and the W matrix. That is, a codebook of the W matrix and a codebook of the P matrix are configured in the BS and the UE and a total of two precoding matrices including each matrix in each codebook are used to configure a precoder. A UE may transmit CSI for selecting the W matrix and CSI for selecting the P matrix to a BS and the BS configures a precoder by combining the W matrix and the P matrix based on the CSI. For example, according to the embodiments of Math Figures 6, 8, 11, 14, 17, and 18 to configure a multi-codebook based precoder, a precoder is configured by a combination of a specific matrix $W_n$ within a first codebook comprised of $n_c$ W matrices (where $n_c$ is an integer equal to or greater than 1) and a specific matrix $P_m$ within a second codebook comprised of $m_c$ P matrices (where $m_c$ is an integer equal to or greater than 1). Namely, according to the exemplary embodiments of the multi-codebook based precoder, $p_c$ (=$n_c \times m_c$) precoders may be configured using two codebooks (the first codebook and second codebook).

Unlike the embodiments of Math Figure 5 to Math Figure 18 in which two codebooks should be configured, the present embodiment defines a codebook P of a combination complete form. That is, the present embodiment configures a precoder based on one codebook P comprised of $p_c$ precoding matrices. However, in the present embodiment, the codebook P is configured hierarchically rather than in parallel. In this case, indexes are assigned to the $p_c$ precoding matrices constituting the codebook P hierarchically rather than sequentially. Hereinafter, a hierarchically configured codebook is referred to as a multi-stage based codebook.

Upon configuring the multi-codebook based precoder, a BS should perform a process for combining W and P. In contrast, upon configuring a multi-stage codebook based precoder, since a multi-stage codebook includes a precoding matrix of a completed form, there is no need to perform a process for combining W and P selected from a plurality of codebooks, for example, two different codebooks. Accordingly, the multi-stage codebook based precoder decreases in configuration complexity compared with the multi-codebook based precoder.

The present embodiment will now be described by taking a 2-stage codebook as an example. A 2-stage codebook P for a specific rank may be expressed as follows:

$$P_{N_t \times R}(k) \in \{P_1^{N_t \times R}, P_2^{N_t \times R}, \ldots, P_{P_c}^{N_t \times R}\} \qquad \text{[Math Figure 19]}$$

In Math Figure 19, $P_i^{N_t \times R}$ (where i=1, ..., $p_c$) is configured to have the following properties.

(1) All precoding matrices are configured such that a partial matrix $P_{M_t \times R, 1}$ is repeated after phase shift as shown in Math Figure 8 or Math Figure 10.
(2) Precoding matrices included in the codebook P are divided into $m_c$ subgroups.
(3) $n_c$ precoding matrices are present in a subgroup.
(4) Partial matrices of precoding matrices within a subgroup are the same.

For example, the 2-stage codebook P for a specific rank may be configured as follows:

TABLE 5

| Subgroup #1 | | Subgroup #2 | | Subgroup #3 | | Subgroup #4 | |
|---|---|---|---|---|---|---|---|
| 1 | 2 | 1 | 2 | 1 | 2 | 1 | 2 |
| $P_1^{N_t \times R}$ | $P_2^{N_t \times R}$ | $P_3^{N_t \times R}$ | $P_4^{N_t \times R}$ | $P_5^{N_t \times R}$ | $P_6^{N_t \times R}$ | $P_7^{N_t \times R}$ | $P_8^{N_t \times R}$ |

Referring to Table 5, the 2-stage codebook P for a specific rank is divided into 4 subgroups each including 2 precoding matrices. To indicate one precoding matrix within the 2-stage codebook P, a subgroup index (hereinafter, i1) indicating a subgroup including the precoding matrix and an element index (hereinafter, i2) indicating the precoding matrix within the subgroup are needed. In Table 5, 2 bits are needed to indicate one subgroup among the 4 subgroups, and one bit is needed to indicate one element among 4 elements within one subgroup. For example, if a UE feeds 3 bits back to a BS as shown in Math Figure 20, the BS may determine or select a corresponding precoding matrix based on the feedback bit stream.

$$\text{PMI: } a_0 \, a_1 \, b_0, \, a_i, \, b_i = 0 \text{ or } 1 \qquad \text{[Math Figure 20]}$$

Referring to Math Figure 20, $a_0 a_1$ corresponding to Most Significant Bits (MSBs) may be used to indicate a subgroup, and $b_0$ corresponding to a Least Significant Bit (LSB) may be used to indicate an element index within the subgroup. That is, $a_0 a_1$ may correspond to i1 and $b_0$ may correspond to i2. The locations of $a_0 a_1$ and $b_0$ are interchangeable.

A UE may inform a BS of preferred precoding matrices by feeding i1 and i2 back to the BS. In this case, the UE may feed i1 an i2 back to the BS as follows:

TABLE 6

| | i1/i2 |
|---|---|
| Frequency granularity 1 | One of i1 and i2 is fed back for a subband and the other is fed back for a wideband. |
| Frequency granularity 2 | One of i1 and i2 is fed back with respect to best-M subbands and the other is fed back for a wideband |
| Time granularity | One of i1 and i2 is fed back at intervals of N1 and the other is fed back at intervals of N2 |
| Unequal protection | One of i1 and i2 (e.g., i1) is coded at code rate having higher reliability and the other (e.g., i2) is coded at code rate having lower reliability |

For example, if the index i1 has a smaller variation according to frequency than the index i2, the UE may transmit i1 to the BS as wideband feedback and transmit i2 to the BS as subband feedback. If N subbands are present in a DL system bandwidth, one i1 may be fed back for all subbands to the BS in the form of wideband at a CSI feedback timing and one i2 may be fed back for one subband or a predefined number of subbands to the BS at a CSI feedback timing. In this case, the UE may transmit one i2 per subband with respect to N subbands spanning the DL system bandwidth or transmit one i2 with respect to best-M subbands having a best channel state among the N subbands. According to circumstances, i2 may be fed back in the form of wideband feedback.

If it is assumed that i2 is transmitted with respect to each of the N subbands, the UE may feed precoding matrix information indicating N precoding matrices as indicated in the following Math Figure back to the BS.

$$\text{PMIs: } a_0 \, a_1 \, b_0 b_1 \ldots b_{N-1}, \, a_i, \, b_i = 0 \text{ or } 1 \qquad \text{[Math Figure 21]}$$

Referring to Math Figure 21, $a_0 a_1$ corresponding to MSBs may be used to indicate a subgroup, and $b_0 b_1 \ldots b_{N-i}$ corresponding to LSBs may be used to indicate element indexes within the subgroup. That is, $a_0 a_1$ may correspond to i1 and $b_i$ may correspond to i2. The locations of $a_0 a_1$ and $b_0 b_1 \ldots b_{N-1}$ are interchangeable.

The BS may transmit data to the UE through one or more subbands. To transmit data to a specific UE, the BS may configure a precoder according to a precoding matrix indicated by i1 and i2, using i1 transmitted for all DL subbands and i2 corresponding to a specific subband through which the BS desires to transmit data to the specific UE. The BS precodes the data to the precoding matrix and transmits the precoded data to the specific UE through the specific subband.

Meanwhile, if it is assumed that the index i1 has less variation according to time than the index i2, the UE may transmit i1 at a long-term interval and transmit i2 at a short-term interval. For example, the UE may feed i1 at a transmission interval corresponding to a positive integer times a transmission interval of i2 back to the BS. instead of configuring i1 and i2 by one bitstream as indicated in Math Figure 20 or Math Figure 21, the UE may separately configure i1 and i2 as follows:

$$\text{i1: } a_0 \, a_1, \, a_i = 0 \text{ or } 1$$

$$i2(s){:}b_0 b_1 \ldots b_{N-1},\ b_i{=}0\ \text{or}\ 1 \qquad \text{[Math Figure 22]}$$

In Math Figure 22, N denotes the number of element indexes i2 that the UE desires to transmit.

The UE may apply error protection schemes of different levels to i1 and i2 and transmit i1 and i2 to the BS. For example, since it transmitted in the form of wideband feedback is a cause of error propagation, a low code rate is applied so that fewer errors are generated. Since i2 transmitted for one subband or a predefined number of subbands, only part of information even is lost if errors are generated. Therefore, a relatively high code rate may be applied to i2. Referring to Math Figure 21, the UE may transmit $a_0 a_1$ corresponding to i1 to the BS after repetition coding and transmit $b_0 b_1 \ldots b_{N-1}$ corresponding to i2 to the BS without repetition coding as indicated in the following Math Figure 23:

$$\text{PMIs:} a_0 a_0 a_2 a_1 b_0 b_1 \ldots b_{N-1}\ \text{or}\ a_0 a_1 a_0 a_1 b_0 b_1 \ldots b_{N-1}, a_i, b_i{=}0\ \text{or}\ 1 \qquad \text{[Math Figure 23]}$$

In this case, the subgroup index i1 is repeatedly coded to lower an error rate and thereafter channel coding used for a feedback channel is additionally applied to the subgroup i1 before transmission.

Meanwhile, the UE may be restricted such that it feeds i1 and i2 within a codebook subset back to the BS. The BS may transmit codebook subset information indicating a codebook subset of a codebook for a specific rank to the UE. The codebook subset information may indicate feedback allowed and/or disallowed precoding matrices. For instance, referring to Table 5, if the BS desires not to use precoding matrices included in the subgroups #1 and #2 among the 4 subgroups for precoding, the BS may transmit, to the UE, information indicating that feedback of precoding matrix information corresponding to the subgroups #1 and #2 is not allowed and/or information indicating that feedback of precoding matrix information corresponding to the subgroups #3 and #4 is allowed. The UE may select precoding matrices for the UE from a codebook subset comprised of the subgroups #3 and #4 based on the above information and feed i1 and i2 corresponding to the selected precoding matrices back to the BS. Since the UE and BS already know the codebook subset, the UE may feed i1 and i2 back to the BS in a form directed by the selected precoding matrices among precoding matrices within the codebook subset. For example, since two subgroups (#3 and #4) can be fed back by the UE, the UE may indicate one of the subgroups #3 and #4 by transmitting i1 of one bit. If feedback of precoding matrix information is restricted to a predefined codebook subset, feedback overhead may be reduced as described above.

For reference, precoding matrices within the multi-stage codebook according to the exemplary embodiment of the present invention may be designed to have the following properties in common.

(1) Constant Modulus (CM): Respective elements of every precoding matrix within the codebook do not include 0 and are configured to have the same size.

(2) Nested property: A precoding matrix for a lower rank is designed to be comprised of a subset of a specific column of a precoding matrix for an upper rank.

(3) Constrained alphabet: Alphabets of each element of every precoding matrix within the codebook are restricted to a predefined number of alphabets.

(4) Stacking property: A correlation exists between two column vectors constituting respective columns within all precoding matrices in the codebook. That is, the second column vector of each column may be obtained by shifting the first column vector by a specific complex weight.

FIG. 8 is a flowchart illustrating DL data transmission according to exemplary embodiments of the present invention. In the case of embodiments of a multi-codebook based precoder, i1 and i2 in FIG. 8 denote information indicating one W matrix within a W codebook and information indicating one P matrix within a P codebook, respectively. In the case of embodiments of a multi-stage based precoder, i1 and i2 in FIG. 8 denote information indicating one subgroup within one codebook and information indicating one precoding matrix within a subgroup, respectively.

Referring to FIG. 8, a BS transmits a DL RS for channel measurement to a UE (step S1010). In the case where the BS supports both a 3GPP LTE system and a 3GPP LTE-A system, the BS may transmit a CRS as the DL RS in every subframe and transmit a CSI-RS as the DL RS in subframes of a predefined interval. If the BS supports only the 3GPP LTE-A system, the BS may not transmit the CRS.

The UE receives the DL RS (step S1010) and may measure a channel formed between the UE and one or more transmission antennas of the BS (step S1020).

The UE may generate RI and/or CQI/PMI based on the measurement. Upon measuring the channel (or estimate the state of the channel), the UE may determine the RI under the assumption that DL transmission is performed throughout N subbands (hereinafter, wideband) spanning an entire DL system bandwidth. In addition, the UE may determine the CQI and/or PMI under the assumption that transmission is performed on the wideband or M specific subbands (where M is a positive integer equal to or greater than 1).

The UE may transmit i1 and i2 at one feedback time point or separately transmit i1 and i2 at different feedback time points (steps S1030a and S1030b). The UE may transmit the CQI and/or RI as well as i1 and i2 to the BS. The UE may select a precoding matrix within a codebook subset rather than in an entire codebook and feed i1 and i2 indicating the selected precoding matrix back to the BS. The codebook subset may be determined by a value signaled by the BS or predefined according to a transmission mode, etc.

The UE may calculate i1 and i2 by assuming that i1 and i2 are applied to different frequency band ranges. For example, one i1 may be transmitted for a wideband and one i2 may be transmitted for one subband or a predefined number of best subbands. The UE may periodically feed i1 and i2 back to the BS or aperiodically feed i1 and i2 back to the BS in response to a request by the BS. If the UE periodically transmits i1 and i2, a transmission interval of i1 and a transmission interval of i2 may differ. For example, i1 may be fed back at a long-term interval and i2 may be fed back at a short-term interval. N1 may be L times (where L is a positive integer equal to or greater than 1) N2. N1 and N2 or N1 and L may be configured by the BS and informed to the UE.

The UE may feed one i1 and one i2 back to the BS by selecting one precoding matrix which can be applied to an entire DL system bandwidth. Hereinafter, such feedback is referred to as Mode-1 feedback. In the Mode-1 feedback, both i1 and i2 may be regarded as being transmitted for a wideband to the BS.

Alternatively, the UE may feed one i1 and one i2 back to the BS by selecting one precoding matrix which can be applied to a specific subband selected by the UE or a predefined number of best subbands selected by the UE. Hereinafter, such feedback is referred to as Mode-2 feedback.

The UE may select preferred precoding matrices with respect to each subband and transmit precoding matrix information indicating the precoding matrices with respect to each subband. To indicate the precoding matrices with respect to each subband, the UE may feed i1, which can be identically applied to N subbands spanning the entire DL system bandwidth, and i2 for each subband back to the BS. Namely, the UE may indicate N precoding matrices for N subbands, and to this end it may feed one i1 for all N subbands and N i2s for the respective N subbands back to the BS. Hereinafter, such feedback is referred to as Mode-3 feedback.

The UE may transmit i1 and i2 through a PUSCH or a PUCCH. Hereinafter, a feedback mode of CSI through the PUSCH is referred to as a PUSCH feedback mode, and a feedback mode of CSI through the PUCCH is referred to as a PUCCH feedback mode. The PUSCH feedback mode may be defined for use in aperiodic transmission in which CSI is fed back at a request time point of the BS or after a predefined time period from the request time point of the BS. The PUCCH feedback mode may be defined for use in periodic CSI transmission.

i1 and i2 may be comprised of one piece of feedback information and may be transmitted on a PUCCH or a PUSCH at a feedback time point. Alternatively, i1 and i2 may be comprised of separate feedback information and may be transmitted through the PUCCH or the PUSCH at different feedback time points.

A feedback channel used for transmission may vary according to feedback mode. For example, the mode-3 feedback in which multiple i2s should be transmitted may be restricted to performing transmission through the PUSCH because a larger amount of information can be simultaneously transmitted to the BS in the PUSCH feedback mode than in the PUCCH feedback mode.

The BS configures a precoder based on the i1 and i2 fed back by the UE and precodes DL data using the precoder (step S1040). The DL data may correspond to one or more layers.

According to the multi-codebook based embodiments among the embodiments of the present invention, the BS may configure one precoding matrix by selecting one of $n_c$ matrices within the W codebook based on i1 and one of $m_c$ matrices within the P codebook based on i2 and combining them. For example, the BS may configure a precoder suitable for a precoding matrix according to any one of the embodiments of Math Figures 6, 8, 11, 14, 17, and 18.

According to the multi-stage codebook based embodiments among the embodiments of the present invention, the BS can be aware that a specific precoding matrix for the UE is included in a subgroup corresponding to i1 among $m_c$ subgroups within one codebook P and that the precoding matrix corresponding to i2 among $n_c$ precoding matrices within the subgroup is the specific precoding matrix. The BS may precode DL data, which is to be transmitted to the UE, using the specific precoding matrix (step S1040). The codebook P may vary according to transmission rank. The BS may determine from which codebook P it should select a precoding matrix based on RI transmitted by the UE.

The precoded DL data is transmitted to the UE through one or more subbands (step S1050).

The UE is aware of a precoding matrix corresponding to the subbands through which the DL data is transmitted. When the UE uses a CRS for data demodulation, the UE may be aware of the precoding matrix actually used by the BS based on information signaled to the UE by the BS. When the UE uses a UE-specific RS for data demodulation, the UE may be aware of the precoding matrix actually used by the BS by detecting the UE-specific RS transmitted by the BS for the UE. Accordingly, the UE may restore one or more layers transmitted by the BS by inversely precoding the precoded DL data.

The BS processor 400b according to the exemplary embodiment of the present invention may control the BS transmitter 100b so as to transmit a DL RS for channel estimation or channel measurement. The transmitter 100b transmits the DL RS through one or more transmission antennas 500b under the control of the BS processor 400b.

The UE receiver 300a receives the DL RS for channel estimation or channel measurement from the BS (step S1010) and transfers the DL RS to the UE processor 400a. The UE processor 400a may estimate or measure the state of a channel formed between one or more reception antennas of the UE and one or more transmission antennas of the BS (step S1020).

The UE processor 400a may generate RI and/or CQI/PMI based on the estimated/measured channel state. Upon estimating/measuring the channel, the UE processor 400a may determine the RI or PMI under the assumption that DL transmission is performed throughout N subbands (a wideband) constituting an entire DL system bandwidth. In addition, the UE processor 400a may determine the CQI and/or PMI under the assumption that transmission is performed on the wideband or M specific subbands (where M is a positive integer equal to or greater than 1).

The processor 400a of the UE may simultaneously or independently code i1 and i2. The UE processor 400a may control the UE transmitter 100a to simultaneously transmit i1 and i2 at one feedback time point or may control the UE transmitter 100a to separately transmit i1 and i2 at different feedback time points (step S1030a and S1030b). The UE processor 400a may generate the CQI and/or RI as well as i1 and i2 and control the UE transmitter 100a to transmit the CQI and/or RI to the BS. The UE processor 400a may be configured to select a precoding matrix within a codebook subset rather than in an entire codebook. The UE processor 400a may configure i1 and i2 to indicate the precoding matrix within the codebook subset.

The UE processor 400a may calculate i1 and i2 by assuming that i1 and i2 are applied to different frequency band ranges. For example, the UE processor 400a may calculate one i1 for a wideband and calculate one i2 for one subband or a predefined number of best subbands. The UE processor 400a may control the UE transmitter 100a to periodically feed i1 and i2 back to the BS or may control the UE transmitter 100a to feed i1 and i2 back to the BS in response to a request by the BS. If the UE processor 400a controls the UE transmitter 100a to periodically feed i1 and i2 back to the BS, the UE processor 400a may set i1 and i2 to have different transmission periods. For example, the UE transmitter 100a may be controlled to feed i1 at a long-term interval and feed i2 at a short-term interval back to the BS. N1 may be L times (where L is a positive integer equal to or greater than 1) N2. N1 and N2 or N1 and L may be configured by the BS and informed to the UE.

The UE processor 400a may select one precoding matrix which can be applied to an entire DL system bandwidth and control the UE transmitter 100a to feed one i1 and one i2 corresponding to the selected precoding matrix back to the BS.

Alternatively, the UE processor 400a may select one precoding matrix which can be applied to a specific subband selected by the UE or a predefined number of best subbands selected by the UE and feed one i1 and one i2 corresponding to the one precoding matrix back to the BS.

Alternatively, the UE processor 400a may select preferred precoding matrices with respect to each subband. To indicate the precoding matrices with respect to each subband, the UE processor 400a may generate i1 which can be identically applied to N subbands spanning the entire DL system bandwidth and i2 for each subband and control the UE transmitter 100a to feed i1 and i2 back to the BS. In this case, the number of i2s is N.

The UE processor 400a may control the UE transmitter 100a to feed i1 and i2 back to the BS through a PUSCH or a PUCCH. The UE processor 400a may control the UE transmitter 100a to perform aperiodic transmission of precoding matrix information through the PUSCH and to perform periodic transmission of precoding matrix information through the PUCCH.

The UE processor 400a may configure i1 and i2 as one piece of feedback information and control the UE transmitter 100a to transmit i1 and i2 through the PUCCH or the PUSCH at a feedback time point. Alternatively, the UE processor 400a may configure i1 and i2 as separate feedback information and control the UE transmitter 100a to transmit i1 and i2 through the PUCCH or the PUSCH at different feedback time points.

The UE processor 400a may control the UE transmitter 100a to use different feedback channels according to feedback modes. For example, in the case of Mode-3 feedback in which multiple i2s should be transmitted, the UE processor 400a may control the UE transmitter 100a to transmit i1 and multiple i2s through the PUSCH.

The BS receiver 300b receives i1 and i2 fed back by the UE and transfers i1 and i2 to the BS processor 400b. The BS processor 400b may select a precoding matrix based on i1 and i2. The BS processor 400b controls the BS transmitter 100b to configure a precoder suitable for the precoding matrix. If the UE transmits i2 with respect to each subband, the BS processor 400b may determine a precoding matrix with respect to each subband and control the BS transmitter 100b to configure the precoder 304 with respect to each subband suitable for a precoding matrix with respect to each subband. DL data that the BS desires to transmit is mapped to one or more transmission layers. The one or more transmission layers are precoded by the precoder 304 (step S1040) and are transmitted to the UE through one or more subbands (step S1050). When a transmission rank is R and the number of transmission antennas configured for transmission of the DL data is $N_t$, an $N_t \times R$ precoder is configured.

According to the multi-codebook based embodiments among the embodiments of the present invention, the BS processor 400b may select one of $n_c$ matrices within the W codebook based on i1 and select one of $m_c$ matrices within the P codebook based on i2. The BS processor 400b may control the BS transmitter 100b to configure the precoder 304 by combining the selected matrices. For example, the BS processor 400b may control the BS transmitter 100b to configure the precoder 304 according to any one of the embodiments of Math Figures 6, 8, 11, 14, 17, and 18.

According to the multi-stage codebook based embodiments among the embodiments of the present invention, the BS processor 400b can be aware that a specific precoding matrix for the UE is included in a subgroup corresponding to i1 among $m_c$ subgroups within one codebook P and that the precoding matrix corresponding to i2 among $n_c$ precoding matrices within the subgroup is the specific precoding matrix. The BS processor 400b may control the BS transmitter 100b to configure the precoder 304 according to the specific precoding matrix. The codebook P may vary according to transmission rank. The BS processor 400b may determine from which codebook P it should select a precoding matrix based on recent RI received from the UE.

The BS processor 400b controls the BS transmitter 100b to transmit the precoded DL data to the UE through one or more subbands (step S1050).

The UE processor 400a is aware of a precoding matrix corresponding to the subbands through which the DL data is transmitted. Accordingly, the UE processor 400a controls the UE receiver 300a to inversely precode the precoded DL data using the precoding matrix. The UE receiver 300a may restore one or more layers transmitted by the BS by inversely precoding the DL data under control of the UE processor 400a.

Although the above-described embodiments of the present invention may be applied irrespective of the number of transmission antennas, it may be applied only to a predefined number of transmission antennas or more. For example, a system which can configure a maximum of two transmission antennas may configure a precoder based on Table 1 and a system which can configure a maximum of four transmission antennas may configure a precoder based on Table 2. A system which can configure transmission antennas more than four may configure a precoder according to one of the exemplary embodiments of the present invention.

According to the exemplary embodiments of the present invention, feedback overhead for indicating precoding matrices is reduced. The feedback overhead is reduced especially when frequency granularities to which i1 and i2 are applied become different. For example, it is assumed that the number of precoders which can be configured by the BS is $p_c(=n_c \times m_c)$, the UE selects precoding matrices according to each subband with respect to N subbands included in a DL system bandwidth, and feedback of CSI indicating the precoding matrices according to each subband to the BS is necessary. If the UE should indicate the precoding matrices for the respective subbands based on a single codebook of a single stage comprised of $p_c$ precoding matrices, since the UE should indicate one of the $P_c$ precoding matrices according to the respective subbands, feedback overhead of N×ceiling{ $\log_2(p_c)$}=N×ceiling{ $\log_2(n_c)+\log_2(m_c)$} occurs. How precoding matrices for the respective subbands based on the multi-codebook or multi-stage codebook, since it is possible to feed one i1 with respect to all subbands and feed i2 with respect to the respective subbands back to the BS, feedback overhead is reduced as ceiling{ $\log_2(n_c)$}+N×ceiling{ $\log_2(m_c)$}. According to the exemplary embodiments of the invention, since feedback periods of i1 and i2 may differ, frequent feedback of elements having less variation according to time may be prevented.

As described above, data transmission efficiency by a large number of transmission antennas can be increased by using the codebook according to the embodiments of the present invention.

Further, the amount of data necessary for feeding information used to determine a precoding matrix back to a transmitter by a receiver can be decreased.

The embodiments of the present invention can be applied to a BS, a UE, or other communication devices in a wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting precoding matrix information by a user equipment to a base station in a wireless communication system, the method comprising:
    selecting, by the user equipment, a precoding matrix for the user equipment from a predefined codebook; and transmitting, by the user equipment, first and second indexes corresponding to the selected precoding matrix,
wherein the predefined codebook includes 'm' subgroups, each of which includes 'n' precoding matrices,
wherein the first index indicates a subgroup, to which the selected precoding matrix belongs, among the 'm' subgroups, and
wherein the second index indicates the selected precoding matrix among the 'n' precoding matrices included in the subgroup that the first index indicates.

2. The method of claim 1, wherein:
the first index is transmitted for a downlink system bandwidth; and
the second index is transmitted for at least one subband in the downlink system bandwidth.

3. The method of claim 2 claim 1, wherein the transmitting of the second index includes transmitting one second index for each subband in a downlink system bandwidth.

4. The method of claim 1, wherein:
the second index is transmitted at a second interval; and
the first index is transmitted at a first interval which is a positive integer multiple of the second interval.

5. The method of claim 1, wherein the predefined codebook is a codebook for a plurality of antenna ports.

6. A method for receiving precoding matrix information by a base station in a wireless communication system, the method comprising:
receiving first and second indexes from a user equipment; and
configuring a precoding matrix for the user equipment from a predefined codebook based on the first and second indexes,
wherein the predefined codebook includes 'm' subgroups, each of which includes 'n' precoding matrices,
wherein the first index indicates a subgroup, to which a precoding matrix selected by the user equipment belongs, among the 'm' subgroups, and
wherein the second index indicates the precoding matrix selected by the user equipment among the 'n' precoding matrices included in the subgroup that the first index indicates.

7. The method of claim 6, wherein:
the first index is for a downlink system bandwidth; and
the second index is for at least one subband in the downlink system bandwidth.

8. The method of claim 6, wherein the receiving of the second index includes receiving one second index for each subband in a downlink system bandwidth.

9. The method of claim 6, wherein:
the second index is received at a second interval; and
the first index is received at a first interval which is a positive integer multiple of the second interval.

10. The method of claim 6, wherein the predefined codebook is a codebook for a plurality of antenna ports.

11. A user equipment for transmitting precoding matrix information to a base station in a wireless communication system, the user equipment comprising:
a transmitter; and
a processor, operatively coupled to the transmitter, configured to control the transmitter,
wherein the processor is configured to select a precoding matrix for the user equipment from a predefined codebook and to control the transmitter to transmit first and second indexes corresponding to the selected precoding matrix,
wherein the predefined codebook includes 'm' subgroups, each of which includes 'n' precoding matrices,
wherein the first index indicates a subgroup, to which the selected precoding matrix belongs, among the 'm' subgroups, and
wherein the second index indicates the selected precoding matrix among the 'n' precoding matrices included in the subgroup that the first index indicates.

12. The user equipment of claim 11, wherein the processor is configured to control the transmitter to transmit one first index for a downlink system bandwidth and transmit at least one second index for at least one subband in the downlink system bandwidth.

13. The user equipment of claim 12, wherein the processor is configured to control the transmitter to transmit one second index for each subband in the downlink system bandwidth.

14. The user equipment of claim 11, wherein the processor is configured to control the transmitter to transmit the second index a second interval and transmit the first index at a first interval which is a positive integer multiple of the second interval.

15. The user equipment of claim 11, wherein the predefined codebook is a codebook for a plurality of antenna ports.

16. A base station for receiving precoding matrix information in a wireless communication system, the base station comprising:
a receiver; and
a processor, operatively coupled to the receiver, configured to control the receiver,
wherein the processor is configured to configure a precoding matrix for a user equipment from a predefined codebook based on first and second indexes received from the user equipment,
wherein the predefined codebook includes 'm' subgroups, each of which includes 'n' precoding matrices,
wherein the first index indicates a subgroup, to which a precoding matrix selected by the user equipment belongs, among the 'm' subgroups, and
wherein the second index indicates the precoding matrix selected by the user equipment among the 'n' precoding matrices included in the subgroup that the first index indicates.

17. The base station of claim 16, wherein the receiver receives one first index for a downlink system bandwidth and receives at least one second index for at least one subband in the downlink system bandwidth.

18. The base station of claim 17, wherein the receiver receives one second index for each subband in the downlink system bandwidth.

19. The base station of claim 16, wherein the receiver receives the second index from the user equipment at a second interval and receives the first index from the user equipment at a first interval which is a positive integer multiple of the second interval.

20. The base station of claim 16, wherein the predefined codebook is a codebook for a plurality of antenna ports.

* * * * *